US010346616B2

(12) United States Patent
Kasiviswanathan et al.

(10) Patent No.: US 10,346,616 B2
(45) Date of Patent: Jul. 9, 2019

(54) SYSTEMS AND METHODS FOR DATA LOSS PREVENTION

(71) Applicant: General Electric Company, Schenectady, NY (US)

(72) Inventors: Shiva Prasad Kasiviswanathan, San Ramon, CA (US); Lei Wu, San Ramon, CA (US); Daniel Edward Marthaler, Oakland, CA (US); Scott Charles Evans, Burnt Hills, CA (US); Varian Paul Powles, Niskayuna, NY (US); Philip Paul Beauchamp, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 144 days.

(21) Appl. No.: 13/942,318

(22) Filed: Jul. 15, 2013

(65) Prior Publication Data

US 2015/0020207 A1 Jan. 15, 2015

(51) Int. Cl.
| | |
|---|---|
| *G06F 7/04* | (2006.01) |
| *G06F 17/30* | (2006.01) |
| *H04N 7/16* | (2011.01) |
| *G06F 21/60* | (2013.01) |
| *G06F 21/55* | (2013.01) |

(52) U.S. Cl.
CPC ............ *G06F 21/60* (2013.01); *G06F 21/554* (2013.01)

(58) Field of Classification Search
CPC ...................... G06F 2212/1032; G06N 99/005
See application file for complete search history.

(56) References Cited

U.S. PATENT DOCUMENTS

| | | | | |
|---|---|---|---|---|
| 7,225,343 | B1 * | 5/2007 | Honig ................... | G06F 21/554 713/189 |
| 8,005,767 | B1 * | 8/2011 | Cassella ............... | G06K 9/6262 706/12 |
| 8,051,187 | B2 | 11/2011 | Noy et al. | |

(Continued)

OTHER PUBLICATIONS

Singh et al., "Investigating and Evaluating Behavioural Profiling and Intrusion Detection Using Data Mining", Information Assurance in Computer Networks, vol. 2052, pp. 153-158, 2001.

(Continued)

*Primary Examiner* — Samson B Lemma
*Assistant Examiner* — Darshan Dhruv
(74) *Attorney, Agent, or Firm* — Fletcher Yoder, P.C.

(57) ABSTRACT

One method for developing a data loss prevention model includes receiving, at a processing device, an event record corresponding to an operation performed on a computing device. The event record includes an event type and event data. The method also includes transforming, using the processing device, the event type to an event number corresponding to the event type. The method includes transforming, using the processing device, the event data to a numerical representation of the event data. The method includes associating an indication of whether the event type and the event data correspond to a data loss event with the event number and the numerical representation. The method also includes determining the data loss prevention model using the indication, the event number, and the numerical representation.

11 Claims, 4 Drawing Sheets

(56) References Cited

U.S. PATENT DOCUMENTS

| | | | |
|---|---|---|---|
| 8,327,443 B2 | 12/2012 | Eiland et al. | |
| 8,407,194 B1* | 3/2013 | Chaput | G06F 21/552 707/694 |
| 8,549,643 B1* | 10/2013 | Shou | G06F 21/556 455/410 |
| 8,613,040 B2* | 12/2013 | Barile | G06F 21/552 709/223 |
| 8,682,814 B2* | 3/2014 | DiCorpo | G06Q 10/0631 706/12 |
| 8,806,628 B2* | 8/2014 | Lingafelt | G06F 21/552 726/22 |
| 8,862,522 B1* | 10/2014 | Jaiswal | G06F 21/6209 706/12 |
| 2004/0044912 A1* | 3/2004 | Connary | H04L 43/045 726/23 |
| 2006/0265745 A1* | 11/2006 | Shackleton | G06F 21/552 726/22 |
| 2007/0094491 A1* | 4/2007 | Teo | H04L 63/1408 713/153 |
| 2011/0225650 A1 | 9/2011 | Margolies et al. | |
| 2012/0131012 A1* | 5/2012 | Taylor | G06Q 10/00 707/748 |
| 2012/0131185 A1* | 5/2012 | Petersen | H04L 41/069 709/224 |
| 2012/0150773 A1 | 6/2012 | Dicorpo et al. | |
| 2012/0303558 A1* | 11/2012 | Jaiswal | G06N 20/00 706/12 |
| 2013/0144819 A1* | 6/2013 | Lin | G06N 5/02 706/12 |
| 2013/0198119 A1* | 8/2013 | Eberhardt, III | G06N 7/005 706/12 |
| 2013/0276127 A1* | 10/2013 | Seshappa | G06F 21/52 726/26 |
| 2014/0173724 A1* | 6/2014 | Lingafelt | G06F 21/552 726/22 |
| 2015/0020207 A1* | 1/2015 | Kasiviswanathan | G06F 21/554 726/26 |
| 2015/0178811 A1* | 6/2015 | Chen | G06Q 30/0631 705/26.7 |
| 2016/0071023 A1* | 3/2016 | Eicher | G06N 20/00 706/12 |

OTHER PUBLICATIONS

Singh et al., "A Proposed Model for Data Warehouse User Behaviour using Intrusion Detection System", ACM SIGSOFT Software Engineering, vol. 37, Issue 6, pp. 1-7, Nov. 2012.

Seleznyov et al., "Learning Temporal Regularities of User Behavior for Anomaly Detection", Information Assurance in Computer Networks, vol. 2052, pp. 143-152, 2001.

Lee et al., "Real Time Data Mining-Based Intrusion Detection", North Carolina State University & Columbia University, 2001.

Anderson et al., "Insider Attack and Real-Time Data Mining of User Behavior", IBM Journal of Research and Development, vol. 51, Issue 3.4, pp. 465-475, May 2007.

Pannell et al., "User Modelling for Exclusion and Anomaly Detection: A Behavioural Intrusion Detection System", User Modeling, Adaptation, and Personalization, vol. 6075, pp. 207-218, 2010.

EPO Search Report and Written Opinion from corresponding EP Application No. 14176572.7 dated Feb. 16, 2015.

Wolfgang Boehmer: "Analyzing Human Behavior Using Case-Based Reasoning with the Help of Forensic Questions", Advanced Information Networking and Applications (AINA), 2010 24th IEEE International Conference on, IEEE, Piscataway, NJ, USA, Apr. 2010, pp. 1189-1194.

Caputo D. et al: "Detecting Insider Theft of Trade Secrets", Security & Privacy, IEEE, IEEE Service Center, Los Alamitos, CA, US, vol. 7, No. 6, Nov. 2009, pp. 14-21.

Tobias Wuchner et al: "Data Loss Prevention Based on Data-Driven Usage Control", Software Reliability Engineering (ISSRE), 2012 IEEE 23rd International Symposium on, IEEE, Nov. 2012, pp. 151-160.

* cited by examiner

SYSTEMS AND METHODS FOR DATA LOSS PREVENTION

BACKGROUND

The subject matter disclosed herein relates to data loss prevention and, more particularly, to systems and methods for determining and using a data loss prevention model.

Insider data loss may occur when an employee exits a company with data and/or intellectual property from the company. For example, certain data loss events may involve data off-boarding. Data off-boarding occurs when data is transmitted, or moved, outside of the company by employees that are leaving the company, or are close to leaving the company. Certain data loss detection schemes view data off-boarding as an outlier detection problem, in which the outliers are the employees who attempt to off-board data. In certain data loss detection schemes, data off-boarding detection is performed manually by an operator looking at event records to detect undesirable events. There may be a large number of event records thereby making it difficult to analyze each of the event records. Furthermore, the analysis of each event record, or a combination of event records, may be complex and difficult to manually perform.

BRIEF DESCRIPTION

In one embodiment, a method for developing a data loss prevention model includes receiving, at a processing device, an event record corresponding to an operation performed on a computing device. The event record includes an event type and event data. The method also includes transforming, using the processing device, the event type to an event number corresponding to the event type. The method includes transforming, using the processing device, the event data to a numerical representation of the event data. The method includes associating an indication of whether the event type and the event data correspond to a data loss event with the event number and the numerical representation. The method also includes determining the data loss prevention model using the indication, the event number, and the numerical representation.

In another embodiment, a method for using a data loss prevention model includes receiving, at a processing device, an event record corresponding to an operation performed on a computing device. The event record includes an event type and event data. The method also includes transforming, using the processing device, the event type to an event number corresponding to the event type. The method includes transforming, using the processing device, the event data to a numerical representation of the event data. The method also includes applying, using the processing device, the data loss prevention model to the numerical representation corresponding to the event number to produce a result. The method includes comparing, using the processing device, the result to a threshold value for the event number. The method includes determining a risk of whether a data loss event has occurred based on the comparison between the numerical representation and the threshold value.

In a further embodiment, a system includes a first processing device configured to receive event records corresponding to respective operations performed on one or more computing devices. Each event record includes an event type and event data. The first processing device is also configured to transform the event type of each of the event records to a respective event number corresponding to the event type, to transform the event data of each of the event records to a respective numerical representation of the event data. Moreover, the first processing device is configured to associate an indication of whether each of the event types and each of the event data correspond to a respective data loss event with each of the event numbers and each of the numerical representations. The first processing device is configured to determine a data loss prevention model using the indication, the event number, and the numerical representation of at least a portion of the event records. The system also includes a second processing device configured to receive a monitored event record corresponding to a monitored operation performed on a monitored computing device. The monitored event record includes a monitored event type and monitored event data. The second processing device is also configured to transform the monitored event type to a monitored event number corresponding to the monitored event type, to transform the monitored event data to a monitored numerical representation of the monitored event data, and to determine a risk of whether a monitored data loss event has occurred using the data loss prevention model.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the presently disclosed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present techniques, the articles "a," "an," "the," and "said" are intended to mean that there are one or more of the elements. The terms "comprising," "including," and "having" are intended to be inclusive and mean that there may be additional elements other than the listed elements.

Figure 1:
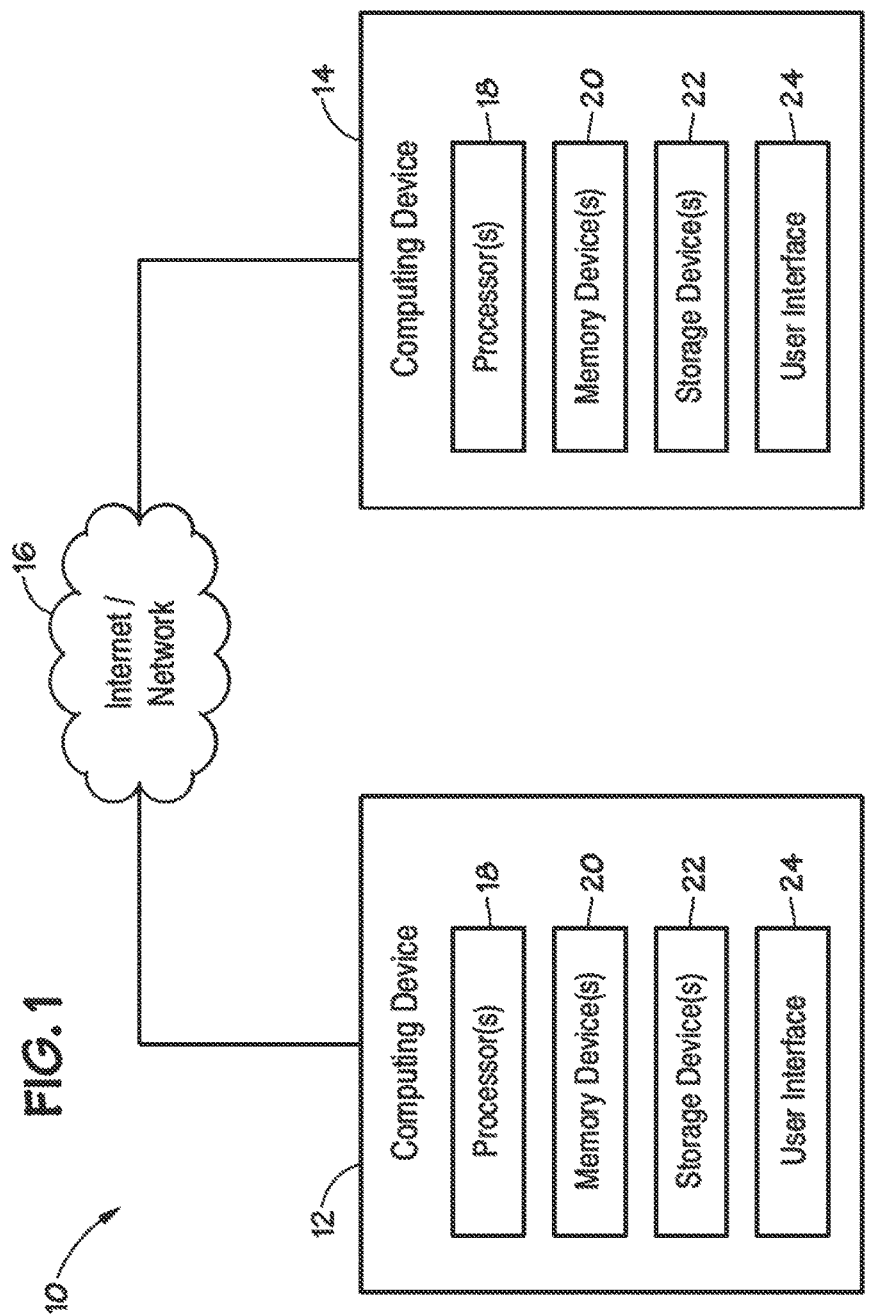
FIG. 1 is a block diagram of an embodiment of a system for data loss prevention, in accordance with the present disclosure.

As illustrated, FIG. 1 is a block diagram of an embodiment of a system 10 for data loss prevention. The system 10 includes computing devices 12 and 14 that may be coupled together by a network 16, such as the Internet, a wide area network (WAN), a local area network (LAN), and so forth. The computing devices 12 and 14 may communicate over the network 16 using wired and/or wireless communication. As may be appreciated, while only two computing devices 12 and 14 are illustrated, any number of computing devices 12 and 14 may be part of the system 10.

Each of the computing devices 12 and 14 includes one or more processors 18, memory devices 20, and storage devices 22. The processor(s) 18 may be used to execute software, such as event logging software, data loss modeling software, data loss training software, data loss detection software, and so forth. Moreover, the processor(s) 18 may include one or more microprocessors, such as one or more "general-purpose" microprocessors, one or more special-purpose microprocessors and/or application specific integrated circuits (ASICS), or some combination thereof. For example, the processor(s) 18 may include one or more reduced instruction set (RISC) processors.

The memory device(s) 20 may include a volatile memory, such as random access memory (RAM), and/or a nonvolatile memory, such as read-only memory (ROM). The memory device(s) 20 may store a variety of information and may be used for various purposes. For example, the memory device(s) 20 may store processor-executable instructions (e.g., firmware or software) for the processor(s) 18 to execute, such as instructions for event logging software, data loss modeling software, data loss training software, data loss detection software, and so forth.

The storage device(s) 22 (e.g., nonvolatile storage) may include ROM, flash memory, a hard drive, or any other suitable optical, magnetic, or solid-state storage medium, or a combination thereof. The storage device(s) 22 may store data (e.g., event records, data loss models, etc.), instructions (e.g., software or firmware for event logging, data loss modeling, data loss training, data loss detection, etc.), and/or any other suitable data.

As illustrated, each of the computing devices 12 and 14 includes a user interface 24. The user interface 24 enables an operator to input data into the respective computing devices 12 and 14 and/or to view output data from the respective computing devices 12 and 14. For example, the user interface 24 enables the operator to perform various tasks on the computing device 12 and 14 that may be monitored, recorded, and/or analyzed. As may be appreciated, the user interface 24 may include a keyboard, a mouse, or any suitable device for inputting data, making selections, and/or operating the computing devices 12 and 14. Furthermore, the user interface 24 may include a display to show data, such as event records, data loss events, etc. The user interface 24 may also include a printer for printing data, such as for printing event records, data loss events, etc.

Each of the computing devices 12 and 14 may include software configured to track operations (e.g., operations performed by an operator, such as by saving data in an event record for certain operations performed by the operator). The software may be configured to track specific operations, such as file transfers (e.g., files transferred from one computing device to another, files transferred from the computing devices 12 and 14 to a removable storage device, files transferred using email, etc.), file downloads, file uploads (e.g., to the Internet), renamed files, and so forth. In certain embodiments, the software may be configured to track any type of operation. The computing devices 12 and 14 may also include software configured to produce a data loss model, train a data loss model, detect data corresponding to a data loss event, and so forth. Accordingly, the computing devices 12 and 14 may facilitate efficient detection that data loss events may have occurred.

Figure 2:
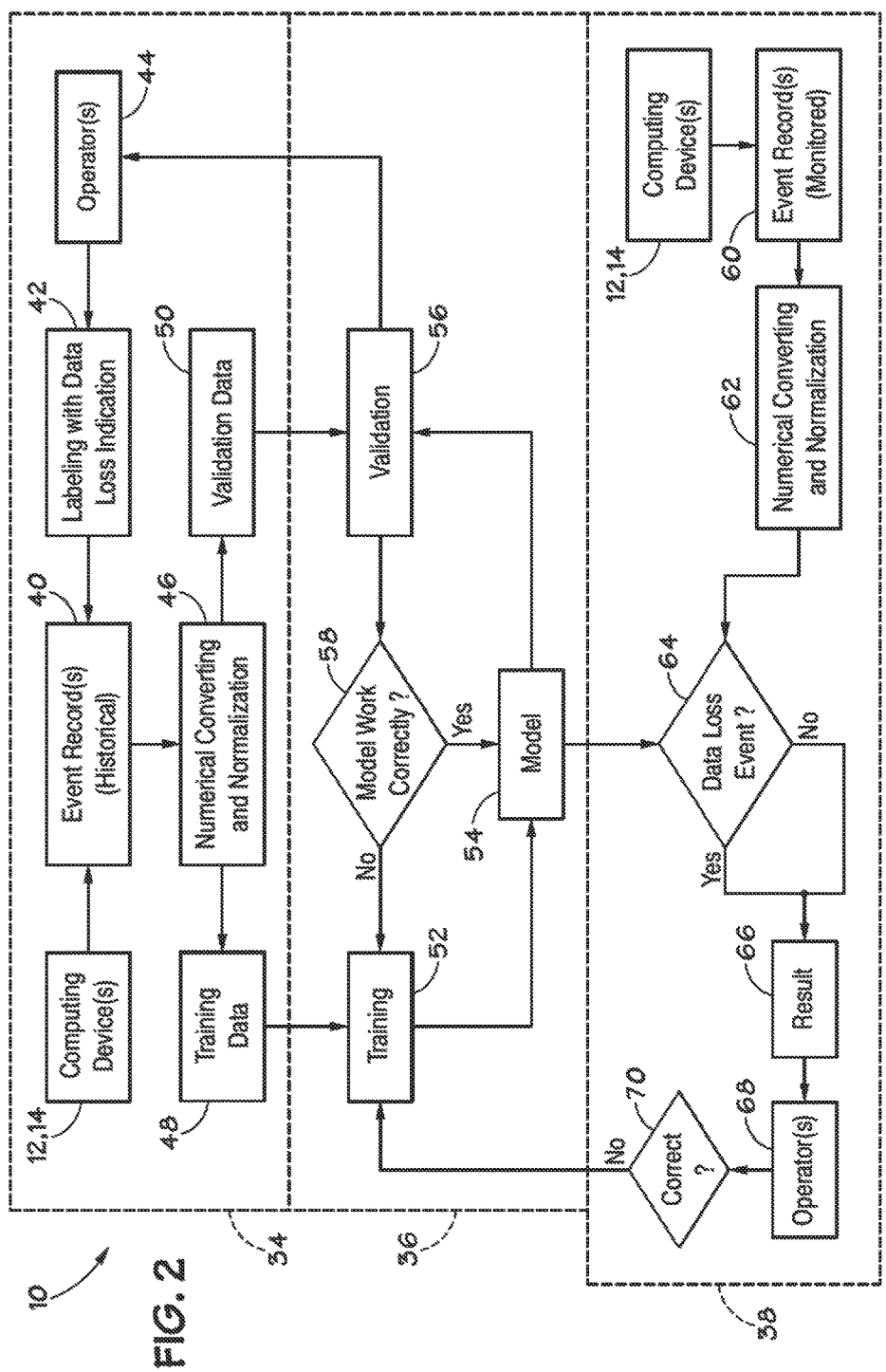
FIG. 2 is a process flow diagram of an embodiment of a system for data loss prevention, in accordance with the present disclosure.

Turning to FIG. 2, a process flow diagram of an embodiment of the system 10 for data loss prevention is illustrated. As a preliminary matter, a set of event records (e.g., historical time sequence data) may be represented by: $X(t) \in \mathbb{R}^{n \times d}$, where t represents a time stamp, $\mathbb{R}$ represents a set of event records, n represents a number of an event record, and d represents a dimension of the feature space of an event record (e.g., a number of features of an event record). Furthermore, a specific set of event records at a time stamp t may be represented by: $X(t) = \{x_i^j(t)\}_{i=1,\ldots,n; j=1,\ldots,d}$, where i is the number of the event record at the time stamp t, and j is the number of the feature of the event record. Similarly, a specific event record i at a time stamp t may be represented by: $x_i(t) = (x_i^1(t), \ldots, x_i^d(t))$.

Moreover, risks (e.g., metadata) associated with the set of event records may be represented by: $Y(t) \in (0,1)$. In certain embodiments, the value of Y(t) represents a risk-level of event records with greater values indicating higher risk level. Furthermore, a risk of a specific event record i at a time stamp t may be represented by: $y_i(t)$. As described in detail below, a function $f$ may be determined for predicting the risk $Y(\tau)$ for a set of event records $X(\tau)$. For example, if the risk $Y(\tau)$ exceeds a predetermined threshold $\theta$, an alarm may be triggered.

The system 10 includes three phases: a data modeling phase 34, a training and validation phase 36, and a detection phase 38. The data modeling phase 34 processes training event records, extracts informative features to represent each time sequence data, and maps the features into a normalized numerical space. The numerical features are associated with corresponding risks. The training and validation phase 36 uses the numerical features and associated risks as training examples, thereby optimizing parameters in a decision model. Furthermore, the training and validation phase 36 validates the decision model by using variances in the performance of the decision model to modify the decision model. The detection phase 38 uses the decision model to determine risks associated with monitored event records.

In the data modeling phase 34, one or more of the computing devices 12 and 14 collects event records 40 (e.g., historical event records, data, etc.) associated with operations performed on the one or more of the computing devices 12 and 14. As may be appreciated, each event record 40 may include a time stamp associated with one or more operations performed and details associated with the one or more operations (e.g., multiple features). For example, one event record 40 may include a time stamp and one or more of a process name, a source drive, a destination drive, a file name, a file location, a file size, and so forth. In certain embodiments, data collection may be performed using a software product, such as Verdasys® Digital Guardian (DG) Data Loss Prevention (DLP) suite produced by Verdasys of Waltham, Mass. The data collection software may monitor various types of data movement at a local end point computer level. The details of the data movement (e.g., event records 40) may be collected at the client (e.g., one or more of the computing devices 12 and 14) and provided to a management server infrastructure (e.g., one of the computing devices 12 and 14) for processing and/or reporting. In the data modeling phase 34, the event records 40 are transformed for producing a data model that may detect when a risk of a data loss event occurs.

Each event record 40 is labeled 42 with an indication of whether a data loss event is believed to have occurred within the event record 40. The event records 40 are labeled 42 by one or more operators 44 (e.g., such as data analysts, experts, etc.). The data from the labeled event records 40 is transformed in a numerical converting and normalization block 46. The numerical converting and normalization block 46 may include normalization, numerical assignment, noise reduction, and so forth.

Specifically, informative operations (e.g., features) may be extracted from the event records 40. The extraction process may include using domain knowledge (e.g., knowledge of important features identified by operators) and/or a formulaic ranking process (e.g., assigning a numerical value to the features based on one or more formulas, weighting, etc.). For example, using domain knowledge, certain features may be determined to not be related to data loss prevention (e.g., random values, values without semantic meaning, etc.). Such features may be directly filtered from the event records 40. Furthermore, the features may be weighted using entropy. For example, the jth feature of n records may be represented as: $x^j = [x_1^j, \ldots, x_n^j]$. Moreover, the Shannon Entropy of the jth feature may be calculated by the formula: $H(x^j) = -\Sigma_i p(x_i^j) \log(p(x_i^j))$, wherein $p(x_i^j)$ is the probability of x having a value of $x_i^j$. Accordingly, if a feature is constant across all records (e.g., the probability of x having a value of $x_i^j$ is 1 (e.g., 100%)), the entropy of the feature is zero and the feature is discarded. Moreover, the features may be ranked based on their entropy. In certain embodiments, the features with a high entropy may be used to detect events that correspond to data loss events.

The features may be transformed into the numerical space. For example, each feature of the event records 40 includes an event type and event data. The event type may be transformed from a description (e.g., text, such as a process name, etc.) to an event number (e.g., feature ID). For example, an event type "PROCESS NAME" may be transformed to an event number "3" associated with "PROCESS NAME." As another example, an event type "DEST DRIVE TYPE" may be transformed to an event number "67" associated with "DEST DRIVE TYPE." Moreover, the event data may be transformed from text and/or a number to a normalized numerical representation of the event data. For example, an event data of "explorer.exe" may have a normalized numerical representation of any suitable number (e.g., 10, 30, 55, 75, 88, etc.). Furthermore, as another example, an event data of "2" may have a normalized numerical representation of any suitable number (e.g., 15, 25, 56, 65, 89, etc.).

The transformation of the event data to a normalized numerical representation may be performed using any suitable method, such as using a non-linear mapping. For example, in certain embodiments, the domain of each discrete feature is finite. In such embodiments, a dictionary D may be represented by: $D = \{c_1, \ldots, c_m, \ldots, c_M\}$, where $c_m$ is a finite value of the feature m. A continuous value for the feature may be generated using the following non-linear mapping: $\emptyset(x_i^j(t)) = R(\Sigma_m \delta_m(x_i^j) \times 2^m)$, where $\delta_m(x), m = 1, \ldots, M$ is an indicator function defined over the dictionary D (e.g., $\delta_m(x) = 1$ if $x = c_m$, and $\delta_m(x) = 0$ if $x \neq c_m$), and R is a real transformation function that transforms each binary code into a real vector.

The numerical features may then be projected onto an $L_2$ ball using the following formula:

$$P_{\Omega_2}(x_i) = \left[ \frac{x_i^1}{\|x^1\|_2}, \ldots, \frac{x_i^d}{\|x^d\|_2} \right]^T.$$

After the projection, the new feature matrix X is denoted $\hat{X}$, wherein $\hat{X} = [P_{\Omega_2}(x_1), \ldots, P_{\Omega_2}(x_n)]$. The feature data output from the numerical converting and normalization block 46 $\hat{X}$ is separated into training data 48 (e.g., $\hat{X}_{tr} \in \mathbb{R}^{n_1 \times d}$) and validation data 50 (e.g., $\hat{X}_{va} \in \mathbb{R}^{n_2 \times d}$). For example, in certain embodiments, the data may be separated using random perturbation and partition. The training data 48 may be used to train a detection model, while the validation data 50 may be used to validate the model. In certain embodiments, approximately 80% of the feature data may be training data 48, while approximately 20% of the feature data may be validation data 50. In other embodiments, any suitable amount of the feature data may be training data 48 and/or validation data 50.

The training data 48 is provided from the data modeling phase 34 to the training and validation phase 36. Specifically, the training data 48 is provided to the training block 52. The training block 52 uses the training data 48 to produce a model 54. As discussed previously, the training data 48 may be represented by: $\hat{X}_{tr} \in \mathbb{R}^{n_1 \times d}$, while its associated risk data may be represented by: $Y_{tr} \in \mathbb{R}^{n_1}$. To simplify the formulas that follow, $x_i \in \hat{X}_{tr}, y_i \in Y_{tr}$ are sampled from the training data 48. The training and validation phase 36 is used to perform a linear regression and to optimize a threshold b at the same time. As may be appreciated, while linear regression is described in the present embodiment, any optimization technique may be used (e.g., non-linear regression, polynomial regression, support vector machine (SVM) regression, etc.).

For example, in certain embodiments, the following formula may be used: $\min_{w,b} \Sigma_i \|y_i - g(\langle x_i, w \rangle - b)\|^2 + \lambda \|w\|^2$, wherein g may be any differentiable transformation with respect to the range of Y to extend the capability of handling low dimensional features. Moreover, the residual may be defined by: $D_i = y_i - g(\langle x_i, w \rangle - b)$, the gradient of the transformation with respect to w may be: $\partial_{i,w} = g'(x)|_{x = \langle x_i, w \rangle - b}$, and the gradient of the transformation with respect to bias (b) may be: $\partial_{i,b} = g'(x)|_{x = \langle x_i, w \rangle - b}$. Furthermore, the main update equations from the gradient descent method may be defined by the following equations, where η is the learning rate.

$$D_i^{k+1} \leftarrow y_i - g(\langle x_i, w^k \rangle - b^k)$$

$$\partial_{i,w}^{k+1} \leftarrow g'(\langle x_i, w^k \rangle - b^k)$$

$$w^{k+1} \leftarrow w^k - 2\eta(\Sigma_i D_i^{k+1} \partial_{i,w}^{k+1} + \lambda w^k)$$

The optimization model may be summarized by the following logical sequence which uses the training data 48 (e.g., $\hat{X}_{tr} \in \mathbb{R}^{n_1 \times d}$), and the risk data (e.g., $Y_{tr} \in \mathbb{R}^{n_1}$). Moreover, the non-linear function g is differentiable, and the variables are initialized as follows: $w^0 = 0$; $w^1 = 1$; $k = 0$; $\varepsilon = 10e-6$.

```
1:  while ‖w^{k+1} − w^k‖ > ε do
2:    Update the residue:
        D_i^{k+1} ← y_i − g (⟨x_i, w^k⟩ − b^k);
```

```
3:   Update the gradient:
       ∂_{i,w}^{k+1} ← g' (⟨x_i, w^k⟩ − b^k) (gradient with respect to w);
       ∂_{i,b}^{k+1} ← g' (⟨x_i, w^k⟩ − b^k) (gradient with respect to b);
4:   Update the decision model:
       w^{k+1} ← w^k − 2η (Σ_i D_i^{k+1} ∂_{i,w}^{k+1} + λw^k);
5:   Update bias:
       b^{k+1} ← b^k − 2η Σ_i D_i^{k+1} ∂_{i,b}^{k+1};
6:   Update the learning rate:
```

$$\eta = \frac{\eta}{\sqrt{k}};$$

```
7:   end while
8:   return decision function g (⟨x̂, w*⟩ − b), where w* is the value w
at convergence.
```

In certain embodiments, such as in a high dimensional space, the previously mentioned functions may be ignored to reduce computational complexity and/or the linear transformation g may also be ignored. Accordingly, the analytical solution to the above method may be: $w^* = (\hat{X}_{tr}^T \hat{X}_{tr} + 2\lambda I)^{-1} \hat{X}_{tr}^T Y_{tr}$ for embodiments in a high dimensional space, where $\hat{X}_{tr}^T$ is the transpose of $\hat{X}_{tr}$.

Validation may also be performed during the training and validation phase 36. For example, the validation data 50 may be provided to the validation block 56. The validation data 50 is used to validate the performance and/or tune parameters (e.g., the regularization parameter λ). For example, at block 58, if the model operates correctly during validation, no changes are made to the model. However, if the model does not work correctly, additional tuning occurs at the training block 52. As may be appreciated, the model 54 may be updated merely by adding additional event records 40 into the data modeling phase 34 and proceeding through the aforementioned steps. Accordingly, when environmental changes occur, the model 54 may be adapted in a simple, efficient, and/or cost effective manner. The model 54 may be tuned to look for any suitable parameters associated with a risk that a data loss event has occurred. For example, the model 54 may be tuned based on employee access levels, employee job title, employee job descriptions, time of day, frequency of data transfers, amount of data transferred, and so forth.

After the model 54 is generated, the model 54 may be provided to a computing device used to detect risks associated with event records. In the detection phase 38, the computing devices 12 and/or 14 monitor events that occur and provide monitored event records 60 (e.g., $X_{te} \in \mathbb{R}^{n_3 \times d}$) that may be tested to determine a risk associated with whether a data loss event has occurred. The event records 60 are provided to a numerical converting and normalization block 62 that operates like the numerical converting and normalization block 46 described previously. After the event records 60 are converted and normalized, a determination is made using the model 54 to determine a risk associated with whether a data loss event has occurred, at block 64.

For example, a sample from the monitored event records 60 may be represented as: $x_{te} \in \hat{X}_{te}$, and the risk associated with the sample may be represented by: $y_{te}$. Thus, the detection process may be represented by: $y_{te}=1$ if $g(\langle \hat{x}, w^* \rangle - b) > 0.5$, otherwise $y_{te}=0$, where $y_{te}=1$ means that the sample event record contains data that represents a risk of a data loss event, and $y_{te}=0$ means that the sample event record does not contain data that represents a risk of a data loss event.

As may be appreciated, the model 54 may be used to process multiple event records 60 concurrently (e.g., batch processing, parallel processing, etc.). For example, for a set of event records 60 represented by: $x_{te}=[x_1, \ldots, x_{n_3}]^T$, where $n_3$ is large, k computing devices may be used to process the event records 60 such that approximately $$\frac{n_3}{k}$$

event records 60 are processed on each computing device. The results from the computing devices may be aggregated into a single report.

The output from block 64 is provided to a results block 66. Moreover, the results from the results block 66 may be provided to one or more operators 68 to analyze the results and determine if the model 54 correctly identified the event records 60. If one or more of the event records 60 were not correctly identified by the model 54, data may be provided to the training block 52 to further refine the model. By using the three phases described herein, a model 54 may be generated, tuned, and/or updated using event records. Furthermore, after the model 54 is validated, the model 54 may be used to detect event records that present a risk that a data loss event has occurred.

Figure 3:
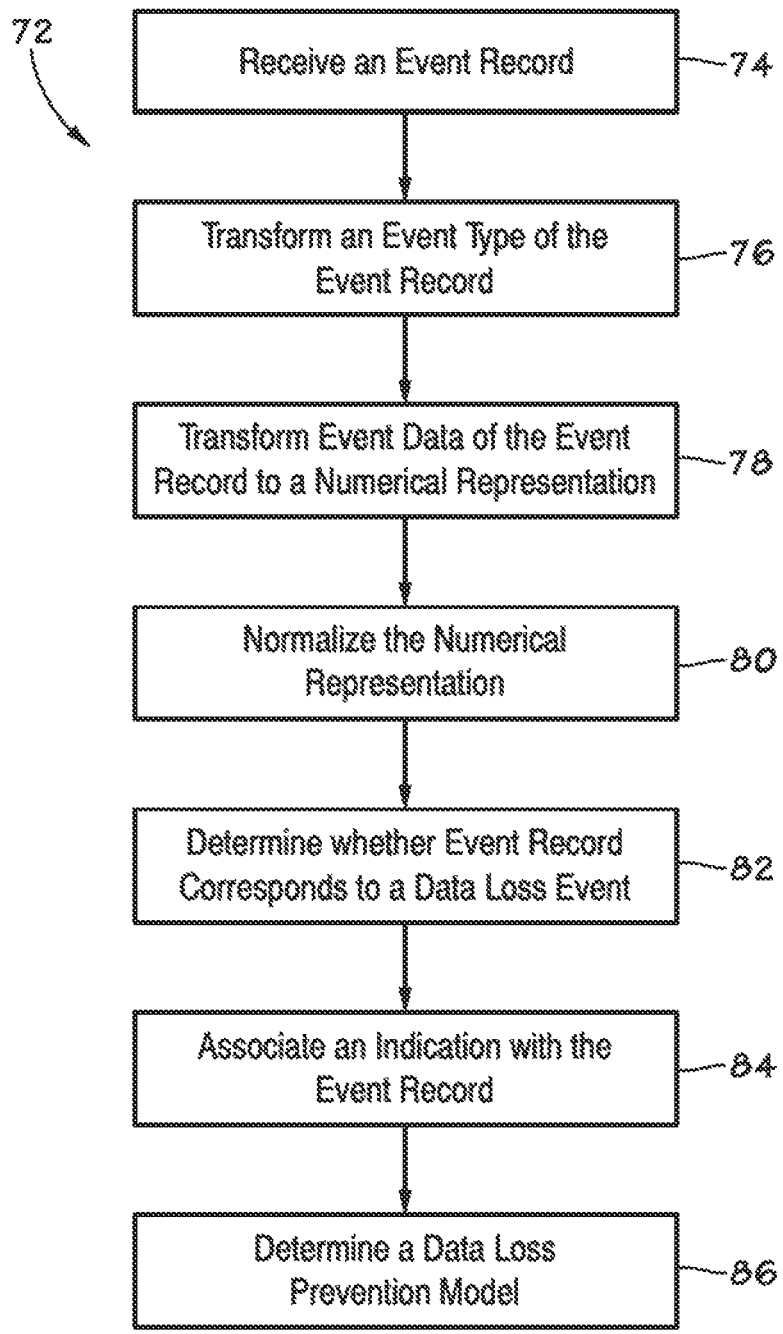
FIG. 3 is a flow chart of an embodiment of a method for developing a data loss prevention model, in accordance with the present disclosure.

FIG. 3 is a flow chart of an embodiment of a method 72 for developing a data loss prevention model. In the method 72, a processing device (e.g., processor(s) 18) receives an event record corresponding to an operation performed on a computing device (e.g., computing device 12 or 14) (block 74). The event record includes an event type and event data. In certain embodiments, one or more processing devices may receive multiple event records. Moreover, each of the event records includes an event type and event data.

The processing device transforms the event type to an event number corresponding to the event type (e.g., using the numerical converting and normalization block 46) (block 76). Moreover, the processing device transforms the event data to a numerical representation of the event data (e.g., using the numerical converting and normalization block 46) (block 78). In certain embodiments, the processing device may normalize the numerical representation of the event data (e.g., using the numerical converting and normalization block 46) (block 80). The processing device may determine whether the event type and the event data correspond to a data loss event (block 82). For example, in some embodiments, an operator (e.g., expert) that analyzes the event record and may determine whether the event record presents a risk that a data loss event has occurred and may provide an indication of the risk. Furthermore, the processing device associates the indication of whether the event type and the event data correspond to the data loss event with the event number and the numerical representation (block 84).

The processing device determines the data loss prevention model using the indication, the event number, and the numerical representation (block 86). In certain embodiments, determining the data loss prevention model includes determining a threshold value for the numerical representation. Moreover, in such embodiments, when the numerical representation is greater than the threshold value, the event record corresponds to the data loss event. In contrast, in other embodiments, when the numerical representation is less than the threshold value, the event record corresponds to the data loss event. As may be appreciated, each of blocks 76 through 86 may be performed using one or multiple event records. Accordingly, by using the method 72, a data loss prevention model may be determined quickly and/or efficiently.

Figure 4:
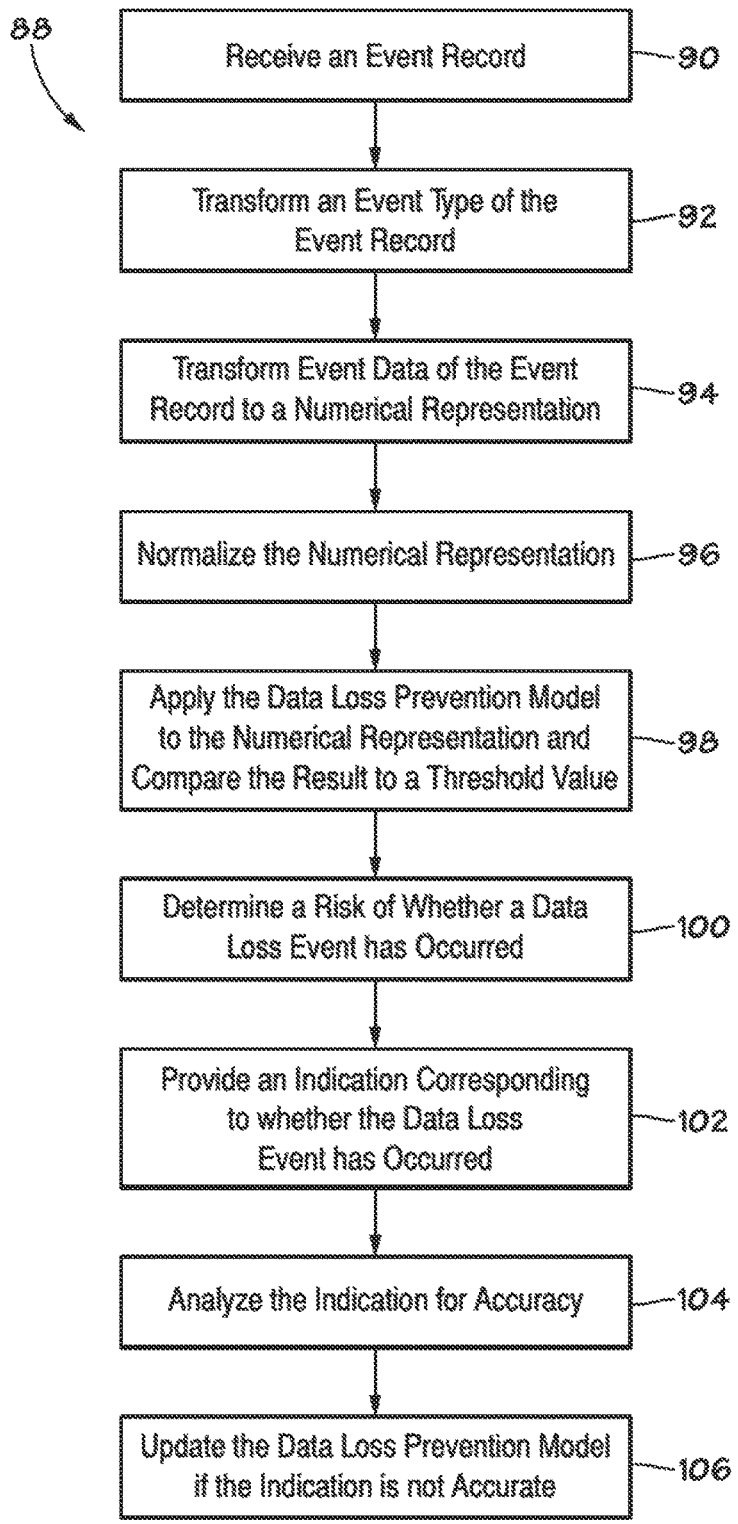
FIG. 4 is a flow chart of an embodiment of a method for using a data loss prevention model, in accordance with the present disclosure.

FIG. 4 is a flow chart of an embodiment of a method 88 for using a data loss prevention model. In the method 88, a processing device (e.g., processor(s) 18) receives an event record corresponding to an operation performed on a computing device (e.g., computing device 12 or 14) (block 90). The event record includes an event type and event data. In certain embodiments, one or more processing devices may receive multiple event records. Moreover, each of the event records includes an event type and event data.

The processing device transforms the event type to an event number corresponding to the event type (e.g., using the numerical converting and normalization block 62) (block 92). Moreover, the processing device transforms the event data to a numerical representation of the event data (e.g., using the numerical converting and normalization block 62) (block 94). In certain embodiments, the processing device may normalize the numerical representation of the event data (e.g., using the numerical converting and normalization block 62) (block 96). The processing device applies the data loss prevention model 54 to the numerical representation corresponding to the event number to produce a result, and the processing device compares the result to a threshold value (e.g., of the data loss prevention model 54) (block 98). Furthermore, the processing device determines a risk of whether a data loss event has occurred based on the comparison between the numerical representation and the threshold value (block 100). The processing device provides an indication corresponding to whether the data loss event has occurred (block 102). Moreover, an operator analyzes the indication to determine whether the indication is accurate (block 104). Furthermore, the data loss prevention model is updated if the indication is not accurate (block 106).

By generating and using the data loss prevention model, data loss events may be detected with little human interaction. Thus, event records may be inspected quickly, efficiently, and/or with low cost, thereby enabling quick detection of event records indicating that a data loss event may have occurred. Accordingly, a company may reduce data off-boarding and/or identify employees involved in data off-boarding, thereby protecting company data and/or intellectual property.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for developing a data loss prevention model, comprising:
   receiving, at a computing device, an event record corresponding to an operation performed on a second computing device, wherein the event record comprises an event type, event data, and a first indication of whether a data loss event occurred, wherein the data loss event includes a movement of data, and wherein the event type comprises a second indication of data transfer, data downloads, data uploads, renamed data, or any combination thereof;
   transforming, using the computing device, the event type to an event number corresponding to the event type, wherein the event number is a pre-defined number that corresponds to the event type;
   transforming, using the computing device, the event data to a numerical representation of the event data via a numerical assignment;
   normalizing, using the computing device, the numerical representation of the event data with non-linear mapping to generate a normalized numerical representation of the event data;
   separating the normalized numerical representation of the event data into training data and validation data, wherein the training data is 80% of the normalized numerical representation of the event data and the validation data is 20% of the normalized numerical representation of the event data;
   associating the event number and the training data with the data loss event when the first indication corresponds to an occurrence of the data loss event;
   determining the data loss prevention model using the first indication, the event number, and the training data, wherein determining the data loss prevention model comprises determining a threshold value for the training data;
   tuning the data loss prevention model using the validation data, instead of the training data, when the data loss prevention model mischaracterizes the validation data;
   applying the data loss prevention model to a network of a company to detect a monitored event record;
   using the data loss prevention model to transform and normalize the monitored event record into a monitored, normalized numerical representation;
   using the data loss prevention model to determine a risk of a data loss event by comparing the monitored, normalized numerical representation to the threshold value; and
   generating, using the computing device, an updated event record based on the risk, wherein the updated event record comprises a third indication corresponding to whether the data loss event has occurred to enable the company to detect and prevent data off-boarding associated with the monitored event record.

2. The method of claim 1, wherein when the monitored, normalized numerical representation is greater than the threshold value, the monitored event record corresponds to the data loss event.

3. The method of claim 1, comprising receiving, at the computing device, a plurality of event records corresponding to a plurality of operations performed on one or more third computing devices, wherein each event record of the plurality of event records comprises the event type, the event data, and the first indication of whether the data loss event occurred.

4. The method of claim 3, comprising transforming, using the computing device, the event type of each of the event records to a respective event number, wherein the respective event number is an additional pre-defined number that corresponds to the event type; transforming, using the computing device, the event data of each of the event records to a respective numerical representation via the numerical assignment; and normalizing, using the computing device, each of the respective numerical representations with non-linear mapping to generate a respective normalized numerical representation, and separating each respective normalized numerical representation of the event data into respective training data and respective validation data.

5. The method of claim 4, comprising associating each of the event numbers and each of the respective training data with a respective data loss event when a respective first indication corresponds to an occurrence of the respective data loss event.

6. The method of claim 4, comprising determining the data loss prevention model using the plurality of first indications, the event numbers and each of the respective training data.

7. The method of claim 1, wherein the first indication is determined by an operator.

8. The method of claim 1, comprising:
receiving, at the computing device, a second event record corresponding to a second operation performed on a third computing device, wherein the second event record comprises a second event type, second event data, and a fourth indication of whether the data loss event occurred, and wherein the second event type comprises a fifth indication of data transfer, data downloads, data uploads, renamed data, or any combination thereof;
transforming, using the computing device, the second event type to a second event number corresponding to the second event type, wherein the second event number is an additional pre-defined number that corresponds to the second event type;
transforming, using the computing device, the second event data to a second numerical representation of the second event data via the numerical assignment;
normalizing, using the computing device, the second numerical representation of the second event data with non-linear mapping to generate a second normalized numerical representation of the second event data;
separating the second normalized numerical representation of the second event data into second training data and second validation data, wherein the second training data is 80% of the second normalized numerical representation of the second event data and the second validation data is 20% of the second normalized numerical representation of the second event data; and
associating the second event number and the second training data with the data loss event when the fourth indication corresponds to an occurrence of the data loss event;
updating the data loss prevention model using the fourth indication, the second event number, and the second training data; and
validating the data loss prevention model using the second validation data, instead of the second training data, by tuning the data loss prevention model when the data loss prevention model mischaracterizes the second validation data.

9. A method for using a data loss prevention model, comprising:
receiving, at a computing device, an event record corresponding to a movement of data performed on a second computing device, wherein the event record comprises an event type and event data, and wherein the event type comprises a first indication of data transfer, data downloads, data uploads, renamed data, or any combination thereof;
transforming, using the computing device, the event type to an event number corresponding to the event type, wherein the event number is a pre-defined number that corresponds to the event type;
transforming, using the computing device, the event data to a numerical representation of the event data via a numerical assignment;
normalizing, using the computing device, the numerical representation of the event data with non-linear mapping to generate a normalized numerical representation of the event data;
separating the normalized numerical representation of the event data into training data and validation data, wherein the training data is 80% of the normalized numerical representation of the event data and the validation data is 20% of the normalized numerical representation of the event data;
determining the data loss prevention model using the first indication, the event number, and the training data, wherein determining the data loss prevention model comprises determining a threshold value for the training data;
applying the data loss prevention model to a network of a company to detect a monitored event record;
using the data loss prevention model to transform and normalize the monitored event record into a monitored, normalized numerical representation;
using the data loss prevention model to determine a risk of a data loss event by comparing the monitored, normalized numerical representation to the threshold value;
providing, using the computing device, a second indication corresponding to whether the data loss event has occurred based on the risk to enable the company to detect and prevent data off-boarding associated with the monitored event record;
analyzing an accuracy of the second indication; and
updating the data loss prevention model when the second indication mischaracterizes whether the data loss event has occurred.

10. The method of claim 9, wherein the threshold value is part of the data loss prevention model.

11. A system comprising:
a first computer having a hardware processor and memory configured to:
receive a plurality of event records corresponding to respective operations performed on one or more computing devices, wherein each event record of the plurality of event records comprises an event type, event data, and a first indication of whether a data loss event occurred, wherein the data loss event includes a movement of data, and wherein the event type comprises a second indication of data transfer, data downloads, data uploads, renamed data, or any combination thereof;
transform the event type of each of the event records to a respective event number corresponding to the event type, wherein the event number is a pre-defined number that corresponds to the event type;
transform the event data of each of the event records to a respective numerical representation of the event data via a numerical assignment;
normalize the respective numerical representation of the event data with non-linear mapping to generate a respective normalized numerical representation of the event data;
separate the respective normalized numerical representation of the event data into respective training data and respective validation data, wherein the training data is 80% of the normalized numerical representation of the event data and the validation data is 20% of the normalized numerical representation of the event data;

associate each of the event numbers and each of the training data with the data loss event when a respective first indication corresponds to an occurrence of the data loss event;

determine a data loss prevention model using the first indication, the event number, and the training data, wherein determining the data loss prevention model comprises determining a threshold value for the training data; and tune the data loss prevention model using the validation data, instead of the training data, when the data loss prevention model mischaracterizes the validation data; and a second computer having a hardware processor and memory configured to:

applying the data loss prevention model to a network of a company to detect a monitored event record corresponding to a monitored operation performed on a monitored computing device, wherein the monitored event record comprises a monitored event type and monitored event data;

use the data loss prevention model to transform the monitored event type to a monitored event number corresponding to the monitored event type;

use the data loss prevention model to transform the monitored event data to a monitored numerical representation of the monitored event data;

use the data loss prevention model to normalize the monitored numerical representation of the monitored event data with non-linear mapping to generate a normalized monitored numerical representation of the monitored event data;

determine a risk of whether a monitored data loss event has occurred using the data loss prevention model; and generate an updated event record based on the risk, wherein the updated event record comprises a third indication corresponding to whether the data loss event has occurred to enable the company to detect and prevent data off-boarding associated with the monitored event record.

\* \* \* \* \*